United States Patent
Young

(10) Patent No.: US 7,431,512 B2
(45) Date of Patent: Oct. 7, 2008

(54) COMPACT LIGHTWEIGHT BEARING ASSEMBLY

(75) Inventor: Phillip D. Young, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 386 days.

(21) Appl. No.: 11/283,105

(22) Filed: Nov. 18, 2005

(65) Prior Publication Data

US 2007/0116396 A1    May 24, 2007

(51) Int. Cl.
*F16C 27/00*    (2006.01)
(52) U.S. Cl. ...................................... 384/535
(58) Field of Classification Search ................ 384/535, 384/536, 581, 582, 245, 218, 219, 99
See application file for complete search history.

(56) References Cited

U.S. PATENT DOCUMENTS

| | | | | |
|---|---|---|---|---|
| 2,543,647 A | * | 2/1951 | Stark et al. | 384/536 |
| 3,053,591 A | * | 9/1962 | Bensch et al. | 384/581 |
| 3,093,427 A | * | 6/1963 | Vasta | 384/536 |
| 3,107,946 A | * | 10/1963 | Drake | 384/222 |
| 5,044,789 A | * | 9/1991 | Damon et al. | 384/581 |
| 5,062,721 A | * | 11/1991 | Chiba | 384/536 |

* cited by examiner

*Primary Examiner*—Thomas R Hannon
(74) *Attorney, Agent, or Firm*—Stephen G. Mican

(57) ABSTRACT

A bearing assembly with a bearing for a rotating element, a bearing assembly housing and a bearing liner inserted between the bearing housing and the bearing liner that has an annular channel that contains an anti-rotation and dampening element and extends from an inner surface of the liner through at least the thickness of the liner.

21 Claims, 2 Drawing Sheets

COMPACT LIGHTWEIGHT BEARING ASSEMBLY

FIELD OF THE INVENTION

The invention relates to bearing assemblies for rotating elements, and more particularly to bearing assemblies that have integral anti-rotation and dampening elements.

BACKGROUND OF THE INVENTION

A bearing for a rotating element typically has a hardened steel bearing liner to improve durability of the bearing assembly housing at the interface of the bearing liner with an outer diameter of the bearing. The liner is generally required where the bearing assembly housing comprises aluminium, which is commonly used to reduce weight of the bearing assembly. Aluminium is too soft for good long-term wear against the outer surface of the bearing. Such a bearing liner may also incorporate an o-ring along its interface with the bearing outer race diameter to assist bearing anti-rotation and vibration dampening. The design of such a bearing liner must also maintain good heat transfer from the bearing to the bearing assembly housing to assure long bearing life.

Bearing assemblies in current use that have such hardened steel bearing liners are generally large and bulky. This is because such a bearing assembly requires a liner that is large enough in diameter and thickness to accommodate the o-ring whilst providing good heat transfer between the outer surface of its bearing.

SUMMARY OF THE INVENTION

The invention comprises an improved bearing assembly for a rotating element that has a bearing housing and a bearing liner inserted between the bearing assembly housing and its bearing, with an anti-rotation and dampening element for its bearing attached to an outer surface of the bearing and mounted in an annular channel that extends from an inner surface of the liner through at least the thickness of the liner.

Generally, the invention comprises a bearing assembly with a bearing for a rotating element, comprising: a housing for the bearing; a bearing liner inserted between the bearing housing and the bearing; an anti-rotation and dampening element for the bearing; and an annular channel for receiving the anti-rotation and dampening element that extends from an inner surface of the liner through at least the thickness of the liner.

DETAILED DESCRIPTION OF THE INVENTION

Figure 1:
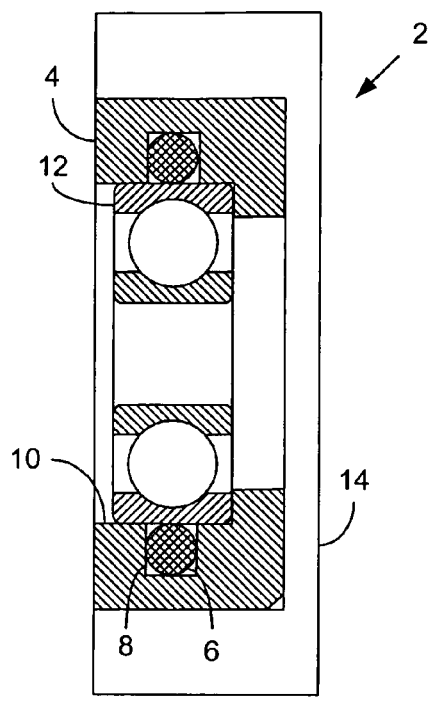
FIG. 1 is a cut-away side view of a bearing assembly with a bearing liner and an integral bearing anti-rotation and dampening element according to the prior art.

FIG. 1 is a cut-away side view of a bearing assembly 2 with a generally cylindrical bearing liner 4 and an integral bearing anti-rotation and dampening element 6, typically an o-ring, according to the prior art. The bearing liner 4 accommodates the bearing anti-rotation and dampening element 6 in a generally annular groove or channel 8 formed along an inner surface 10 of the bearing liner 4, such as by machining. The bearing assembly 2 has a generally cylindrical housing 14 that typically comprises aluminium to minimise weight of the bearing assembly 2. The bearing liner 4 fits within the housing 14 to mount a bearing 12 for a rotating element (not shown), such as a drive shaft. The bearing 12 may comprise any sort of bearing usable for this purpose, such as a rotating bearing, typically of the ball or roller type, or a plain bearing, typically of the sleeve type. FIG. 1 shows the bearing 14 as a ball type rotating bearing only for purposes of illustration.

The bearing liner 4 must have a sufficient wall thickness near its channel 8 to securely mount within the housing 14. Consequently, the diameter and overall size of the bearing liner 4 is substantially greater than would be necessary without the inclusion of the bearing anti-rotation and dampening element 6. Since the housing 14 contains the bearing liner, the overall size and weight of the bearing assembly 2 is greater than would be necessary without the inclusion of the bearing anti-rotation and dampening element 6.

Figure 2:
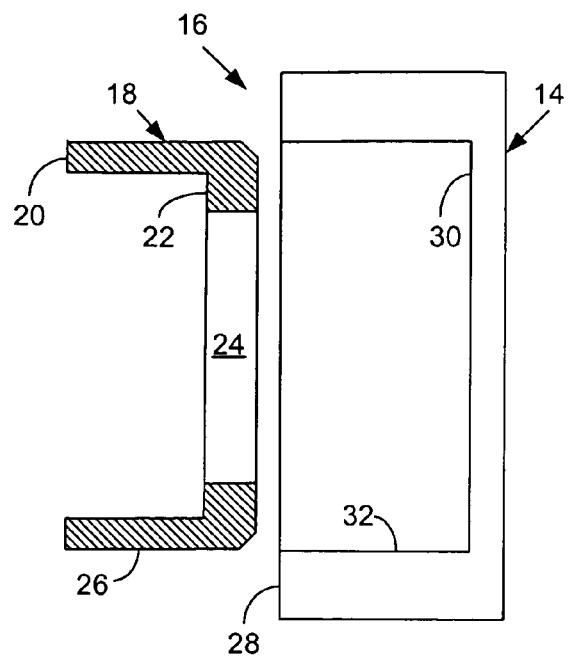
FIGS. 2 through 4 show cut-away side views of steps in manufacture of a bearing assembly with a bearing liner and an integral bearing anti-rotation and dampening element according to a possible embodiment of the invention.
Figure 3:
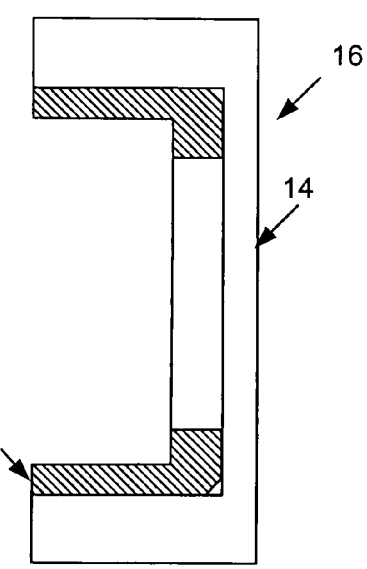
Figure 4:
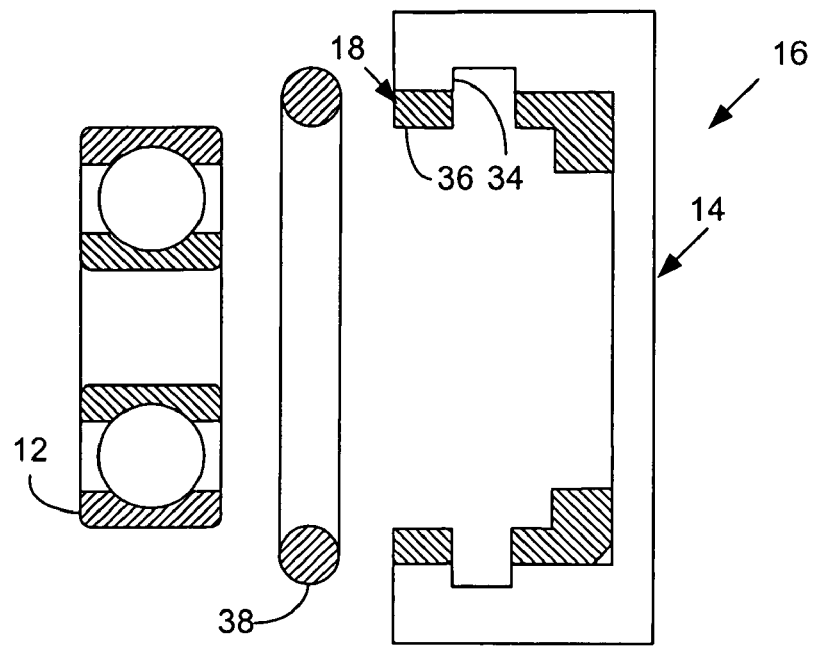

FIGS. 2 through 4 show cut-away side views of steps in manufacture of a bearing assembly 16 with a bearing liner and an integral bearing anti-rotation and dampening element according to a possible embodiment of the invention. Referring to FIG. 2, the bearing assembly 16 comprises a generally cylindrical bearing liner 18 made of a durable material with good wear characteristics, such as hardened steel, has a first end 20 that is open an a second end 22 that typically has an aperture 24. An outer surface 26 of the bearing liner 18 preferably has knurling along at least a portion of its length.

The bearing assembly 16 also comprises a generally cylindrical housing 14 made of a lightweight material, such as aluminium or aluminium alloy. The housing 14 has a first end 28 that is open for receiving the bearing liner 18 and a second end 30 that is typically closed. The first step of manufacturing the bearing assembly 16 comprises inserting the bearing liner 18 within the housing 14 so that an inner surface 32 of the housing mates with the bearing liner outer surface 26 as shown in FIG. 3. Matching the diameter of the bearing liner outer surface 26 with the diameter of the housing inner surface 32 and heating the housing 14 before assembly achieves a thermal interference fit. Furthermore, the knurling along at least a portion of the bearing liner outer surface 26 provides an interference fit as well. Either in addition to the interference fit or instead of the interference fit, a locking adhesive can bind the bearing liner 18 to the housing 14.

The second step of manufacturing the bearing assembly 16 comprises forming a generally annular groove or channel 34 from an inner surface 36 of the bearing liner 18 that extends or penetrates through at least the thickness of the bearing liner 18, and preferably extends or penetrates into the housing 14 as shown in FIG. 4. A preferred method of forming the channel 34 comprises machining. The third step of manufacturing the bearing assembly 16 comprises inserting a bearing anti-rotation and dampening element 38, typically an o-ring, into the channel 34. The diameter and thickness of the bearing anti-rotation and dampening element 38 should preferably be slightly larger in diameter than the radial thickness of channel 34.

Figure 5:
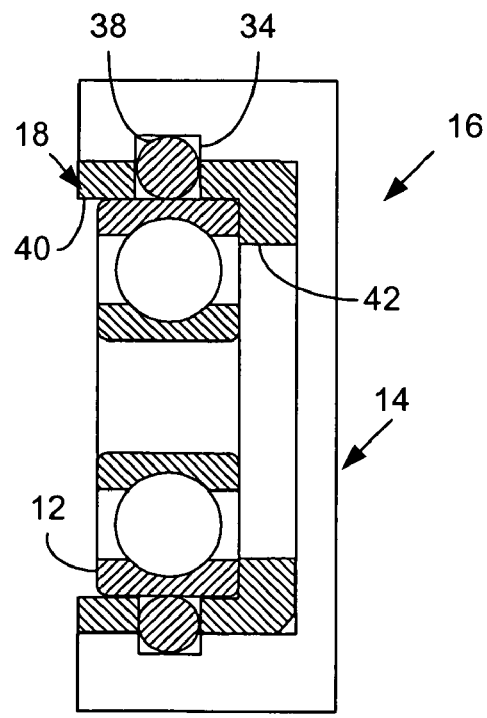
FIG. 5 shows a cut-away side view of a complete bearing assembly with a bearing liner and an integral bearing anti-rotation and dampening element according to a possible embodiment of the invention.

The fourth step of manufacturing the bearing assembly 16 comprises inserting a bearing 12 for a rotating element (not shown), such as a drive shaft, into the bearing liner 18. FIG. 5 shows the complete bearing assembly 16 after assembly. The bearing 12 may comprise any sort of bearing usable for this purpose, such as a rotating bearing, typically of the ball or roller type, or a plain bearing, typically of the sleeve type. FIGS. 4 and 5 show the bearing 12 as a ball type rotating bearing only for purposes of illustration.

As a possible alternate embodiment of the bearing assembly 16 shown in FIG. 5, the bearing liner 18 may comprise two sections, an inner section 40 and an outer section 42. In this case, the step of inserting the bearing liner 18 comprises inserting the inner section 40 first and then inserting the outer section 42, with a spacing between the inner section 40 and the outer section 42 forming at least an inner portion of the channel 34.

Described above is a bearing assembly with a bearing for a rotating element, a bearing assembly housing and a bearing liner inserted between the bearing housing and the bearing liner that has an annular channel that contains an anti-rotation and dampening element and extends from an inner surface of the liner through at least the thickness of the liner. The described embodiments of the invention are only illustrative implementations of the invention wherein changes and substitutions of the various parts and arrangement thereof are within the scope of the invention as set forth in the attached claims.

What is claimed is:

1. A bearing assembly with a bearing for a rotating element, comprising:
    a housing for the bearing;
    a bearing liner inserted between the bearing housing and the bearing;
    an anti-rotation and dampening element for the bearing; and
    an annular channel for receiving the anti-rotation and dampening element that extends from an inner surface of the liner into the housing.

2. The bearing assembly of claim 1, wherein an outer surface of the bearing liner has knurling along at least a portion of its length and the outer surface of the bearing liner and an inner surface of the housing have an interference fit.

3. The bearing assembly of claim 1, wherein an inner surface of the housing and an outer surface of the bearing liner have a thermal interference fit.

4. The bearing assembly of claim 1, wherein a locking adhesive binds the bearing liner to the housing.

5. The bearing assembly of claim 1, wherein the anti-rotation and dampening element comprises an o-ring.

6. The bearing assembly of claim 1, wherein the bearing liner comprises hardened steel.

7. The bearing assembly of claim 1, wherein the housing comprises aluminium.

8. The bearing assembly of claim 1, wherein the channel extends into the housing.

9. The bearing assembly of claim 1, wherein the bearing liner comprises an inner section and an outer section and a spacing between the inner section and the outer section forms at least a portion of the annular channel.

10. A bearing assembly with a bearing for a rotating element, comprising:
    a housing for the bearing that has a generally cylindrical inner surface;
    a bearing liner inserted between the bearing housing and the bearing that has knurling along at least a portion of a generally cylindrical outer surface to establish an interference fit with the inner surface of the bearing housing;
    an o-ring; and
    an annular channel for receiving the o-ring that extends from an inner surface of the liner into the housing.

11. The bearing assembly of claim 10, wherein the bearing liner comprises a hardened steel.

12. The bearing assembly of claim 10, wherein the housing comprises a aluminium.

13. A method of manufacturing a bearing assembly with a bearing for a rotating element, comprising the steps of:
    inserting a bearing liner with a generally cylindrical outer surface into a generally housing with a generally cylindrical inner surface;
    forming a generally annular channel in the bearing liner that extends from an inner surface of the bearing liner into the housing;
    inserting an anti-rotation and dampening element for the bearing in the channel; and
    inserting a bearing into the bearing liner.

14. The method of claim 13, further comprising the step of knurling at least a portion of the bearing liner outer surface to secure an interference fit between the bearing liner outer surface and the housing inner surface.

15. The method of claim 13, further comprising the steps of:
    matching the diameter of the bearing liner outer surface with the diameter of the housing inner surface; and
    heating the housing before assembly to achieve a thermal interference fit.

16. The method of claim 13, further comprising the step of applying a locking adhesive to the bearing liner outer surface and housing liner inner surface interface.

17. The method of claim 13, further comprising the step of selecting an anti-rotation and dampening element that comprises an o-ring.

18. The method of claim 13, further comprising the step of selecting a bearing liner that comprises a hardened steel.

19. The method of claim 13, further comprising the step of selecting a housing that comprises aluminium.

20. The method of claim 13, wherein the step of forming a generally annular channel in the bearing liner that extends from an inner surface of the bearing liner through at least the thickness of the bearing liner further comprises machining the channel into the bearing liner.

21. The method of claim 13, wherein the step of inserting the bearing liner into the housing further comprises inserting a two piece bearing liner with an inner section and an outer section into the housing, wherein a spacing between the inner section and the outer section forms at least a portion of the annular channel.

* * * * *